US012404070B2

(12) United States Patent
Guo et al.

(10) Patent No.: US 12,404,070 B2
(45) Date of Patent: Sep. 2, 2025

(54) PACKING BOX

(71) Applicant: ShenZhen YUTO Packaging Technology Co., Ltd., Shenzhen (CN)

(72) Inventors: Zhongqiang Guo, Shenzhen (CN); Yuansheng Liang, Shenzhen (CN)

(73) Assignee: SHENZHEN YUTO PACKAGING TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/389,745

(22) Filed: Dec. 19, 2023

(65) Prior Publication Data
US 2024/0286794 A1     Aug. 29, 2024

(30) Foreign Application Priority Data
Feb. 23, 2023    (CN) .......................... 202320390283.X

(51) Int. Cl.
*B65D 13/00*    (2006.01)

(52) U.S. Cl.
CPC .......... *B65D 13/00* (2013.01); *B65D 2313/04* (2013.01)

(58) Field of Classification Search
CPC ........ B65D 5/009; B65D 5/50; B65D 5/5011; B65D 13/00; B65D 5/5038; B65D 5/503; B65D 15/00; B65D 15/24

USPC .......................................................... 206/748
See application file for complete search history.

(56) References Cited

U.S. PATENT DOCUMENTS

| 1,448,435 | A | * | 3/1923 | Davis ................... | B65D 5/5253 229/87.01 |
| 2,387,790 | A | * | 10/1945 | Williamson ............. | B65D 5/48 206/750 |
| 11,407,552 | B2 | * | 8/2022 | Peng .................... | B65D 81/113 |
| 12,016,440 | B2 | * | 6/2024 | Holland ................. | A45C 11/16 |

* cited by examiner

*Primary Examiner* — Anthony D Stashick
*Assistant Examiner* — Raven Collins
(74) *Attorney, Agent, or Firm* — Arch & Lake LLP

(57) ABSTRACT

Provided is a packaging box. The packaging box includes a first box body including a first accommodating part having a first accommodating cavity and a first opening communicating with the first accommodating cavity in a first direction; a connection assembly including a pair of connecting plates that are distributed opposite to each other on two sides of the first box body in a second direction, where the second direction intersects with the first direction; a second box body connected to one plate of the pair of connecting plates and having a second accommodation cavity; and a third box body connected to the other plate of the pair of connecting plates and having a third accommodation cavity, where the packaging box is configured to switch between a first state and a second state to close or open the first opening.

17 Claims, 7 Drawing Sheets

PACKING BOX

CROSS-REFERENCE TO RELATED APPLICATION

The present disclosure is based upon and claims priority to Chinese Patent Applications No. 202320390283.X, filed on Feb. 23, 2023, the entire content of which is incorporated herein by reference for all purposes.

TECHNICAL FIELD

The present disclosure relates to the field of packaging technology, and specifically to a packaging box.

BACKGROUND

At present, the packaging boxes on the market usually open the flip cover to see a single display or a single combination of the products in the box. Moreover, the very few packaging boxes on the market with different display functions usually only allow a user to see the products when the user open the packaging box. The user can only see one of the products in the box, or the user can only see another product in the box, and the user cannot display all the products in the box at the same time.

SUMMARY

In view of the above technical problems, the present disclosure provides a packaging box that can be transformed into different structures so that the products in the box can be displayed in a variety of ways to meet the different needs of users.

According to the first aspect of the present disclosure, a packaging box is provided. The package box comprises: a first box body, including a first accommodating part having a first accommodating cavity and a first opening communicating with the first accommodating cavity in a first direction; a connection assembly, including a pair of connecting plates that are distributed opposite to each other on two sides of the first box body in a second direction, where the second direction intersects with the first direction; a second box body connected to one plate of the pair of connecting plates and having a second accommodation cavity; and a third box body connected to the other plate of the pair of connecting plates and having a third accommodation cavity, where the packaging box is configured to switch between a first state and a second state to close or open the first opening.

The packaging box provided by the present disclosure includes a first box body, a second box body, a third box body and a connection assembly, and can be converted between the first state and the second state. The first box body, the second box body, and the third box body respectively has an accommodating cavity that can accommodate products. In the first state, the connecting plates arranged in pair are attached to the side walls of the first box in the second direction, and the second box body and the third box body jointly close the first opening of the first box body along the first direction, thus facilitating the display of products in the second box and the third box. In the second state, the connecting plates arranged in pair are at least partially separated from the side walls, and the first opening is open, which facilitates the display of products in the first box, the second box and the third box. By changing the positional relationship between the connection assembly and the first box body, the packaging box can be converted between different states, so that it can have multiple forms of combination structures and multiple ways of product display effects.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
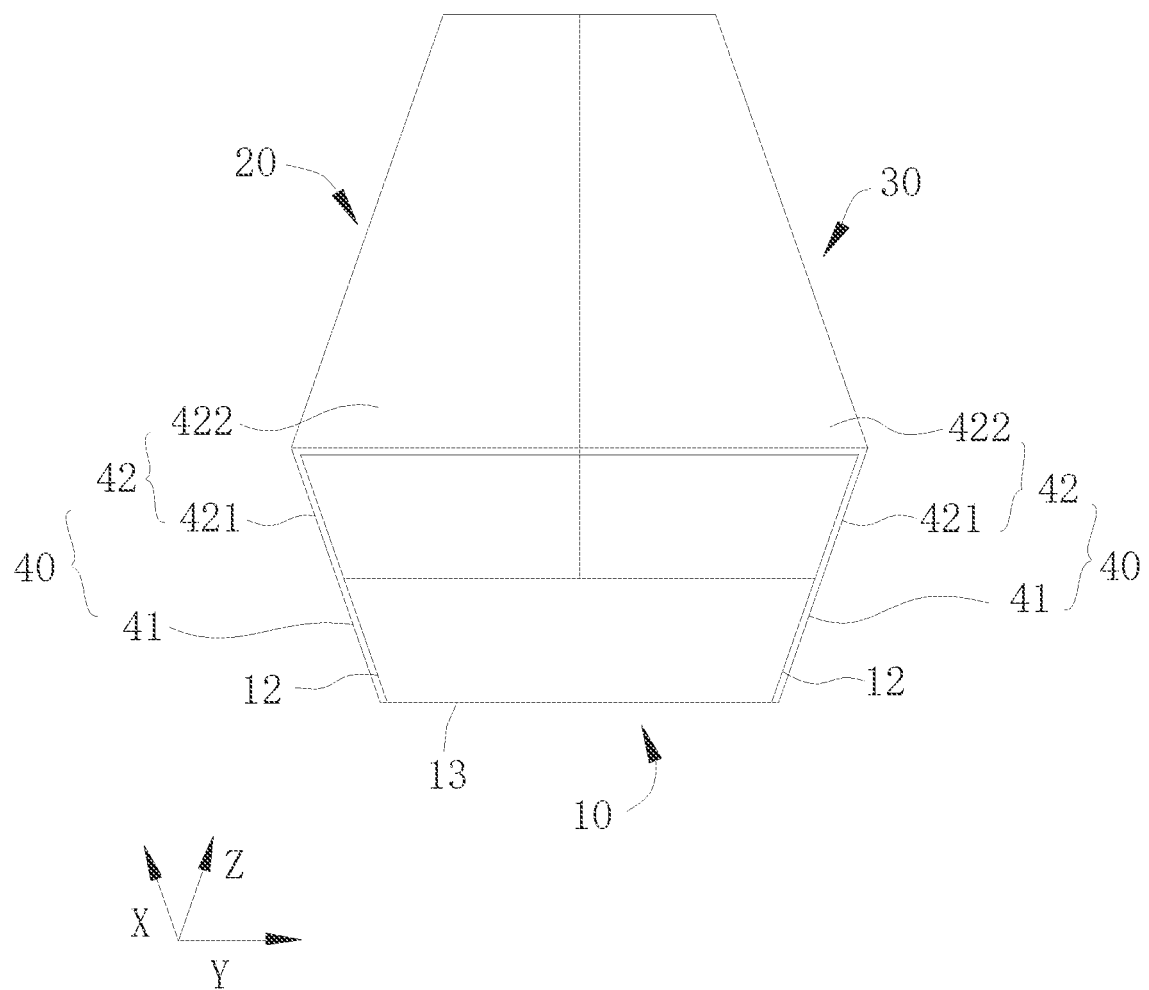
FIG. 1 is a schematic structural diagram of the packaging box provided by the present disclosure in a first state.

Examples of the present disclosure are described in detail below, and examples of the examples are shown in the accompanying drawings. When the following description refers to the drawings, the same numbers in different drawings refer to the same or similar elements unless otherwise indicated. The implementations described in the following examples do not represent all implementations consistent with The present disclosure. Rather, they are merely examples of apparatus and methods consistent with aspects of the application as detailed in the appended claims.

It should be understood by those of skill in the art that, unless specifically stated, the singular forms "one," "a/an," "said," and "the/this" as used herein may also include the plural form. It should be further understood that the terms "comprising," "comprises" or any other variations thereof are intended to cover a non-exclusive inclusion, such that a process, method, article or device that includes a series of elements not only includes those elements, It also includes other elements not expressly listed or inherent in the process, method, article or apparatus. Without further limitation, an element defined by the statement "comprises a . . . " does not exclude the presence of other identical elements in the process, method, article or device including the element. In addition, the application may be implemented differently. Components, features, and elements with the same names in the examples may have the same meaning or may have different meanings. Their specific meanings need to be determined based on their interpretation in the specific example or further combined with the context of the specific example.

It should be understood that although the terms first, second, third, etc. may be used herein to describe various information, the information should not be limited to these terms. These terms are only used to distinguish information of the same type from each other. For example, without departing from the scope of this document, the first information may also be called second information, and similarly, the second information may also be called first information. Depending on the context, the word "if" as used herein may be interpreted as "when" or "when" or "in response to determining." Furthermore, as used herein, the singular forms "a," "an" and "the" are intended to include the plural forms as well, unless the context indicates otherwise. It should be further understood that the terms "comprising" and "including" indicate the presence of stated features, steps, operations, elements, components, items, categories, and/or groups, but do not exclude one or more other features, steps, operations, The presence, occurrence, or addition of elements, components, items, categories, and/or groups. The terms "or" and "and/or" as used herein are to be construed as inclusive or to mean any one or any combination. Therefore, "A, B or C" or "A, B and/or C" means "any of the following: A; B; C; A and B; A and C; B and C; A, B and C." Exceptions to this definition occur only when a combination of elements, functions, steps, or operations is inherently mutually exclusive in some manner. When describing the structure of a component, when one layer or region is referred to as being "on" or "above" another layer or region, it can mean that it is directly on the other layer or region, or is between it and the other layer or region. There are other layers or areas between another layer and another area. And if the part is turned over, that layer, one area, will be "under" or "under" another layer, area. In the example of the present disclosure, "B corresponding to A" means that B is associated with A, and B can be determined based on A. However, it should also be understood that determining B based on A does not mean determining B only based on A. B can also be determined based on A and/or other information.

It should be understood that the specific examples described here are only used to explain the present disclosure and are not used to limit the present disclosure.

In the subsequent description, the use of suffixes such as "module," "component" or "unit" used to represent elements is only to facilitate the description of the present disclosure and has no specific meaning in itself. Therefore, "module," "component" or "unit" may be used interchangeably.

The applicant found that the packaging boxes currently on the market are usually of clamshell design, and only a single display effect or a single combination effect of the products in the box can be seen. There are also some packaging boxes with different display functions that usually only open the packaging box. One of the products in the box can be seen, or only another product in the box can be seen. All products in the box cannot be displayed at the same time, which affects the display of the products in the box and limits user needs.

In view of the above analysis, the present disclosure provides a packaging box, which includes a first box body, a connection assembly, a second box body, and a third box body. By changing the positional relationship between the connection assembly and the first box body, the packaging box can switch between different states allowing the packaging box to have a variety of combination structures, and can display products in a variety of ways under a variety of combination structures, which is conducive to improving the versatility of the packaging box, and can meet the needs of different users.

Referring to FIGS. 1 to 8, an example of the present disclosure provides a packaging box, which includes a first box body 10, a connection assembly, a second box body 20 and a third box body 30. The first box body 10 includes a first accommodating part 11 having a first accommodating cavity 11a and a first opening 11b communicating with the first accommodating cavity 11a in a first direction X. The connection assembly includes connecting plates 40 arranged in pairs and distributed opposite to each other on two sides of the first box body 10 in a second direction Y, where the second direction Y intersects with the first direction X. The second box body 20 is connected to one of the pair of connecting plates 40 and has a second accommodating cavity 21a. The third box body 30 is connected to the other one of the pair of connecting plates 40 and has a third accommodating cavity 31a. The packaging box can be switched between the first state and the second state to close or open the first opening 11b.

In some examples, the packaging box has a three-dimensional structure arranged along the first direction X, the second direction Y, and the third direction Z.

In some examples, the packaging box can be placed on a stable plane. For convenience of explanation, the packaging box is placed on a horizontal surface. At this time, the upper part of the vertical direction corresponds to the upper part of the examples of the present disclosure. The lower part of the vertical direction corresponds to the lower part of the examples of the present disclosure, but the packaging box of the examples of the present disclosure can also be placed on a surface that is inclined relative to the horizontal surface while maintaining a stable state.

The first box body 10 includes the first accommodating part 11, and the first accommodating part 11 has a first accommodating cavity 11a and a first opening 11b communicating with the first accommodating cavity 11a in the first direction X. In some examples, the first containing cavity 11a can be used to place products. The present disclosure does not limit the type of the product. The user can view or pick up and place the products in the first box body 10 through the first opening 11b.

The second box body 20 includes a second accommodating cavity 21a, and the third box body 30 includes a third accommodating cavity 31a. In practical applications of the packaging box provided by the examples of the present disclosure, the first accommodating cavity 11a and the second accommodating cavity 21a can be respectively used to contain product.

Alternatively, the first containing cavity 11a, the second containing cavity 21a and the third containing cavity 31a can contain the same product, and of course, can also contain different products.

Alternatively, the second box body 20 and the third box body 30 may have the same shape and size. Of course, they may also be set to be different, that is, the volumes of the second accommodation cavity 21a and the third accommodation cavity 31a may be the same. They don't have to be the same.

Alternatively, the same or different storage clips can be provided in the first accommodating cavity 11a, the second accommodating cavity 21a and the third accommodating cavity 31a, so that the products in the box can be relatively fixed to the packaging box, which is conducive to improving the stability and reliability of the packaging box structure. In some other examples, the first accommodating cavity 11a, the second accommodating cavity 21a and the third accommodating cavity 31a do not need to be provided with storage clips, which is beneficial to improving the versatility of the product, so that the packaging box can accommodate a variety of different types of products.

Alternatively, the packaging box can be switched between the first state and the second state to close or open the first opening 11b. When the packaging box is in the first state, the first opening 11b is closed, and when the packaging box is in the second state, the first opening 11b is open.

In some examples, in the first state, the connecting plates 40 arranged in pairs are attached to the side walls 12 of the first box body 10 in the second direction Y, and the second box body 20 and the third box body 30 jointly close the first opening 11b. And in the second state, the pair of connecting plates 40 are at least partially separated from the side walls 12, and the first opening 11b is open.

Figure 2:
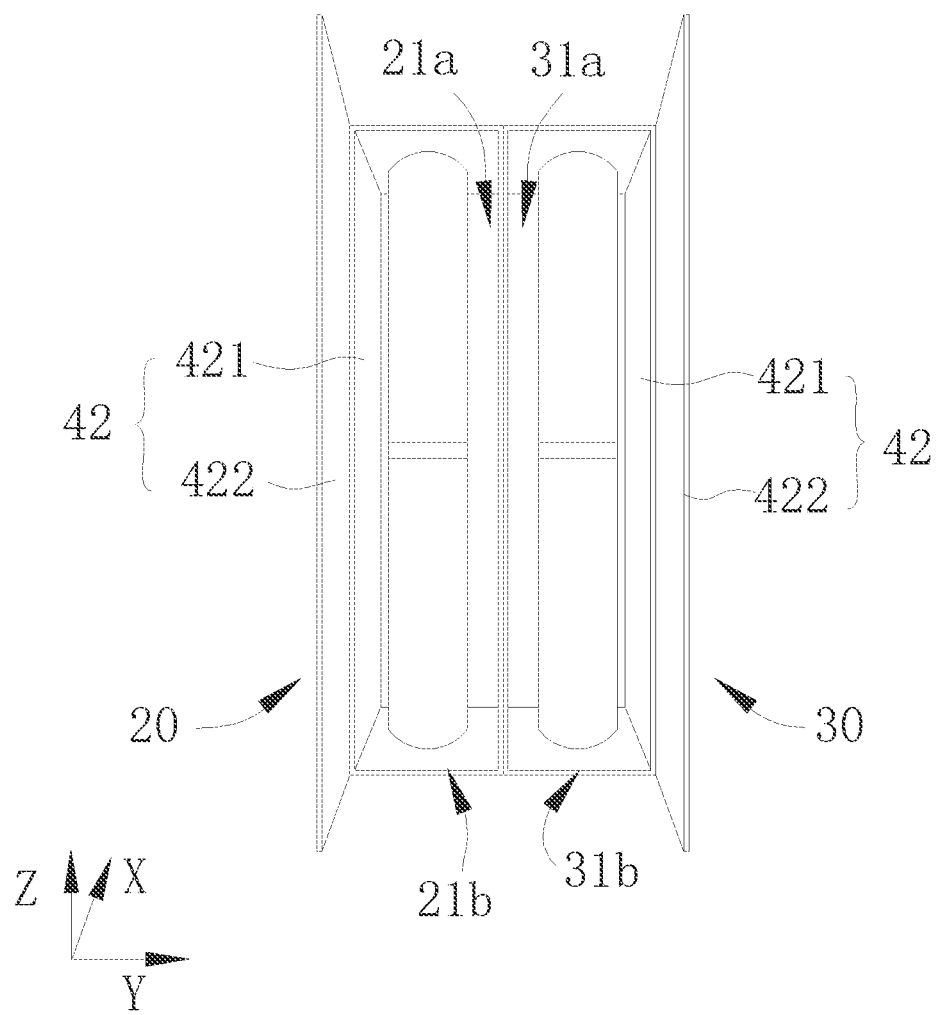
FIG. 2 is another structural schematic diagram of the packaging box provided by the present disclosure in the first state.

As shown in FIGS. 1 and 2, FIGS. 1 and 2 can respectively represent the structural schematic diagram of the packaging box in the first state. When the packaging box is in the first state, the pair of connecting plates 40 are attached to the side walls 12 of the first box body 10 in the second direction Y, and the second box body 20 and the third box body 30 are arranged to jointly close the first opening 11b along the first direction X.

Alternatively, in the first state, the second box body 20, the third box body 30 and the first box body 10 are stacked along the first direction X, and are all clamped between the opposite connecting plates 40, so that the first opening 11b is closed.

The packaging box in the first state as shown in FIG. 1 is convenient for transportation and carrying, prevents the products in the first box body 10, the second box body 20 and the third box body 30 from falling out, and improves the protection of the products, which is conducive to improving the reliability of the packaging box.

As shown in FIG. 2, the packaging box in the first state, the second box body 20 and the third box body 30 can be opened to display the products in the box. When the user only wants to open the second box body 20 and/or the third box body 30, it is convenient for the user to view or pick and place the products in the second box body 20 and the third box body 30.

In some alternative examples, the first box body 10 includes a bottom wall 13 arranged opposite to the opening along the first direction X, and the connecting plates 40 arranged in pairs are bendably connected/in a bending connection to the bottom wall 13.

The bottom wall 13 is a structure located at the bottom of the first box body 10, that is, a structure on the side away from the second box body 20 and/or the third box body 30 along the first direction X in the first state. Alternatively, the bottom wall 13 may be a plate-like structure, and of course, it may also be a curved structure, a wave structure, etc.

By arranging the connecting plates 40 to be bendably connected to the bottom wall 13, it is convenient to change the positional relationship between the connection assembly and the first box body 10, so that the packaging box has different forms of combined structures, the structure is simple and easy to operate, and in addition, connecting the connecting plates 40 to the bottom wall 13 of the first box body 10 is also beneficial to saving costs and facilitating processing.

In order to facilitate the description of the process of changing the form structure of the packaging box provided in the present disclosure, the examples of the present disclosure will be specifically described with reference to the first side and the second side. As shown in FIG. 1, the side of the first box body 10 close to the second box body 20 along the first direction X is a first surface, and the side of the first box body 10 away from the second box body 20 along the first direction X is the second surface. When the packaging box is deformed to transform into different states, bending in the direction of the first surface means that the first surface of the two relatively bent parts forms an angle less than 180°, and the second surface forms an angle greater than 180°. Correspondingly, bending toward the second surface means that the second surface of the two relatively bent parts forms an angle of less than 180°, and the first surface forms an angle of greater than 180°, which will not be described in detail in the present disclosure.

Alternatively, the connecting plates 40 arranged oppositely can be connected to the bottom wall 13 in a bendable manner, and when the angle between the connecting plates 40 and the bottom wall 13 is at a certain angle, the connecting plates 40 arranged in pairs are attached to the side walls 12 of the first box body 10 in the second direction Y and are connected to the second box body 20 and the third box body 30 respectively, so that the packaging box is in the first state. By turning the connecting plates 40 in the first state at a certain angle along the second surface direction, the pair of connecting plates 40 are at least partially separated from the side walls 12, the first opening 11b is opened, and the packaging box is in the second state.

In some alternative examples, the connecting plate 40 includes a first plate 41 and a second plate 42 that can be bent and connected. The second box body 20 is connected to one of the pair of second plates 42, and the third box body 30 is connected to the other of the pair of second plates 42. In the first state, the pair of first plates 41 are attached to the side walls 12 of the first box body 10 in the second direction Y. In the second state, the pair of first plates 41 and the side walls 12 are at least partially separated.

Through the power arrangement, it is convenient to bend the connecting plates 40 to change the positional relationship between the connection assembly and the first box body 10, so that the packaging box has various forms of combination structures and various ways of product display effects, and the structure is simple and easy to operate.

Alternatively, the first plate 41 is disposed between the bottom wall 13 and the second plate 42, and can be bendably connected to the bottom wall 13 and the second plate 42 respectively.

In some alternative examples, the second box body 20 has a second opening 20b communicating with the second accommodation cavity 20a in the first direction. The third accommodating cavity 30a communicates with the third opening 30b. The second plate 42 includes a pair of first sub-plates 421 and a pair of second sub-plates 422 that can be bent and connected. A first sub-plate 421 is disposed between the first plate 41 and a second sub-plates 422 and is connected respectively. The first plate 41 and the second sub-plates 422 can be connected in a bending manner. One of the pair of second sub-plates 422 can close the second opening 20b. The other one can be provided to close the third opening 30b.

Arranged in this manner, it is beneficial to ensure the effectiveness of the connecting plate 40 being able to bend to change the positional relationship between the connection assembly and the first box body 10, thereby allowing the packaging box to have various forms of combination structures and various forms of product display effects. The structure is simple and easy to operate.

The second sub-plates 422 are respectively a structure located on the top of the second box body 20, that is, a structure on the side away from the first box body 10 along the first direction X in the first state. Correspondingly, the first sub-plates 421 are respectively a structure located on the top of the second box body 20, that is, a structure on the side away from the first box body 10 along the first direction X in the first state.

By arranging the first sub-plates 421 and the second sub-plates 422, they can be bent and connected to the connecting plates 40 respectively, so that the user can open the second opening 21b by flipping the first sub-plates 421, so that the products in the second accommodating cavity 21a of the second box body 20 are displayed to facilitate the user to observe or pick up the products, and/or the user flips the second sub-plate 422 to open the third opening 31b, so that the products in the third accommodating cavity 31a of the third box body 30 are displayed to facilitate users to observe or pick up the products.

Additionally, the second opening 20b and the third opening 30b in the first direction facilitate the users to observe or pick up the products from the second box body 20 and the third box body 30, thus improving the versatility of the packaging box.

In some alternative examples, the second state includes a first sub-state and a second sub-state, and the packaging box can switch between the first sub-state and the second sub-state. In the first sub-state, the connecting plates 40 arranged in pairs are respectively arranged on both sides of the first box body 10 along the second direction Y. In the second sub-state, the connecting plates 40 arranged in pairs are arranged respectively on the first box body 10 10 along one side of the first direction X.

The packaging box can be converted between a first state and a second state, the second state includes a first sub-state and a second sub-state, and the packaging box can be converted between the first sub-state and the second sub-state, that is to say, the packaging box provided by the present disclosure can convert between the first state, the first sub-state and the second sub-state.

Please refer to FIGS. 3 to 6. Alternatively, the packaging box can include two different morphological structures in the first sub-state. FIGS. 3 to 6 can respectively show the structural schematic diagrams of the packaging box in the first sub-state.

Figure 3:
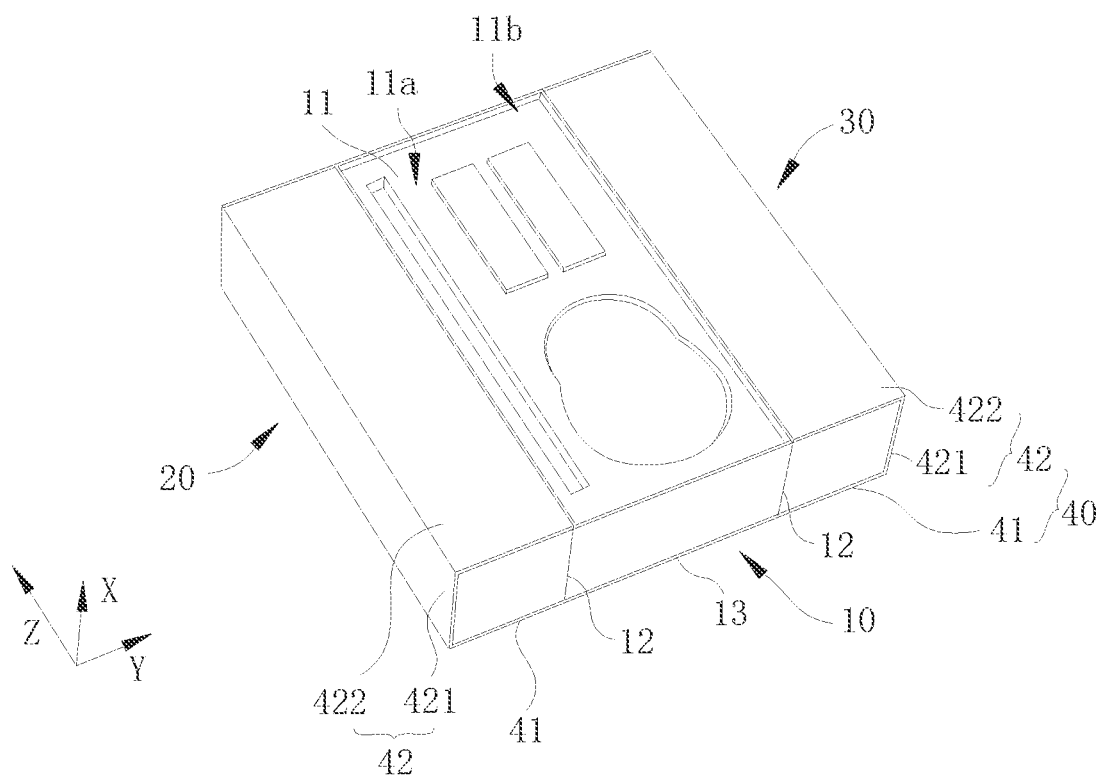
FIG. 3 is a schematic structural diagram of the packaging box provided by the present disclosure in the second state.
Figure 4:
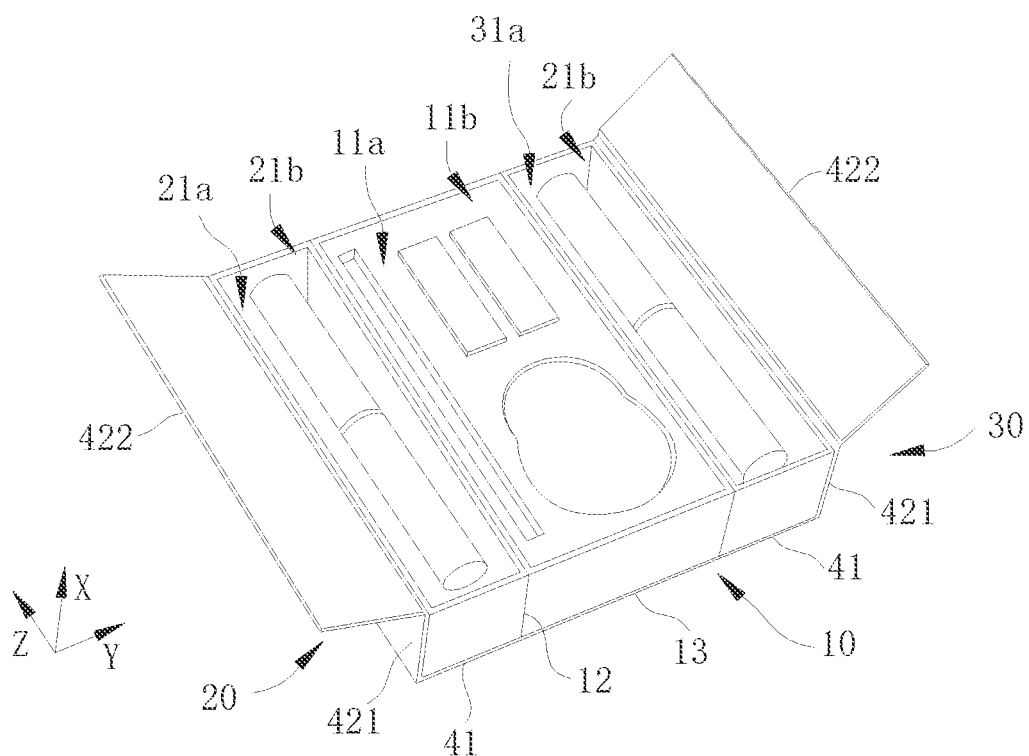
FIG. 4 is another structural schematic diagram of the packaging box provided by the present disclosure in the second state.

Alternatively, the connecting plates 40 arranged in pairs in the packaging box in the first state (as shown in FIG. 1) are first turned over to a certain angle toward the second surface direction, and then turned over to a certain angle toward the first surface direction, so that the connecting plates 40 arranged in pairs are respectively located on both sides of the first box body 10 in the second direction Y and are at least partially separated from the side wall 12 so that the first opening 11b is opened. At this time, the state of the packaging box transits from the first state to the first sub-state in the second state, and the packaging box is in the first form structure in the first sub-state (as shown in FIG. 3).

For example, the connecting plates 40 arranged in pairs in the packaging box in the first state are first turned 90° toward the second surface direction, and then turned 90° toward the first surface direction, so that the packaging box is in the first sub-surface. The first morphological structure in the state.

Specifically, the pair of first plates 41 in the packaging box in the first state are turned over 90° toward the second surface direction relative to the bottom wall 13, and then the pair of second plates 42 and/or the pair of first sub-plates 421 are turned 90° toward the first surface direction relative to the first plate 41, so that the packaging box is converted from the first state (as shown in FIG. 1) to the first form structure in the first sub-state. (As shown in FIG. 3).

At this time, the second box body 20 is located on one side of the first box body 10 in the second direction Y and is attached to the first box body 10, and the third box body 30 is located on one side of the first box body 10 in the second direction Y. The other side on Y is arranged in close contact with the first box body 10, and the first opening 11b is opened. The user can observe the products in the first accommodating part 11 through the first opening 11b, or take and place them through the first opening 11b.

Furthermore, the first sub-plate 421 and the second sub-plate 422 are respectively turned away from each other at a certain angle toward the second surface direction, so that the second opening 21b and the third opening 31b are opened, and the user can access the second opening 21b through the second opening 21b. Observing the products in the second box body 20, or taking and placing the products in the second box body 20 through the second opening 21b. Correspondingly, the user can observe the products in the third box body 30 through the third opening 31b, or access to the products in the third box body 30 through the third opening 31b.

Alternatively, the connecting plates 40 arranged in pairs in the packaging box in the first state (as shown in FIG. 1) are first turned over to a certain angle toward the second surface direction, so that the connecting plates 40 arranged in pairs are respectively located at The first box body 10 is at least partially separated from the side wall 12 on both sides in the second direction Y, so that the first opening 11b is opened. At this time, the packaging box is converted from the first state to the first state of the second state. Sub-state, the packaging box is in the second form structure in the first sub-state (as shown in FIG. 5).

For example, the connecting plates 40 arranged in pairs in the packaging box in the first state are turned over 90° toward the second direction respectively, so that the packaging box is in the second form structure in the first sub-state.

Figure 5:
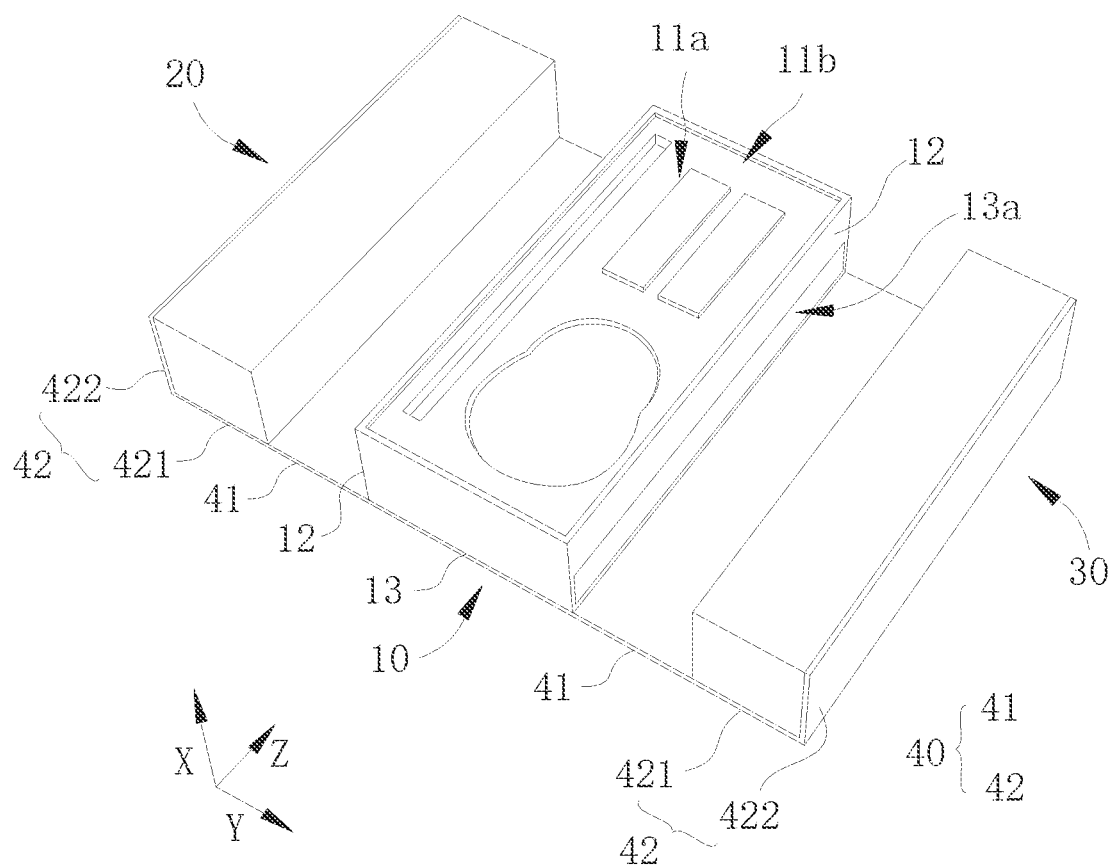
FIG. 5 is another structural schematic diagram of the packaging box provided by the present disclosure in the second state.

Specifically, the paired first plates 41 in the packaging box in the first state are turned over 90° toward the second surface direction relative to the bottom wall 13 to convert the packaging box from the first state (as shown in FIG. 1) is the first morphological structure in the first sub-state (as shown in FIG. 5).

At this time, the second box body 20 is located on one side of the first box body 10 in the second direction Y and is spaced apart from the first box body 10, and the third box body 30 is located on the first box body 10 in the second direction Y. On the other side and spaced apart from the first box body 10, the first opening 11b is open and the user can observe the product in the first containing part 11 through the first opening 11b, or take and place the first product through the first opening 11b. products in the accommodating part 11.

Furthermore, the first sub-plate 421 and the second sub-plate 422 are respectively turned away from each other at a certain angle toward the second surface direction, so that the second opening 21b and the third opening 31b are opened, and the user can access the second opening 21b through the second opening 21b. Observing the products in the second box body 20, or taking and placing the products in the second box body 20 through the second opening 21b, correspondingly, the user can observe the products in the third box body 30 through the third opening 31b, or through the third opening 31b. The three openings 31b allow access to the products in the third box body 30.

With this arrangement, when the packaging box is in the first sub-state, the products in the first box body 10 can be visually displayed, and the second box body 20 and the third box body 30 can also be opened according to user needs. In order to display the products of the first box body 10, the second box body 20 and the third box body 30, that is to say, the packaging box proposed in The present disclosure can not only display some products, but also display all the products at the same time, which is conducive to improving packaging. The versatility of the box can meet the needs of different users.

Figure 7:
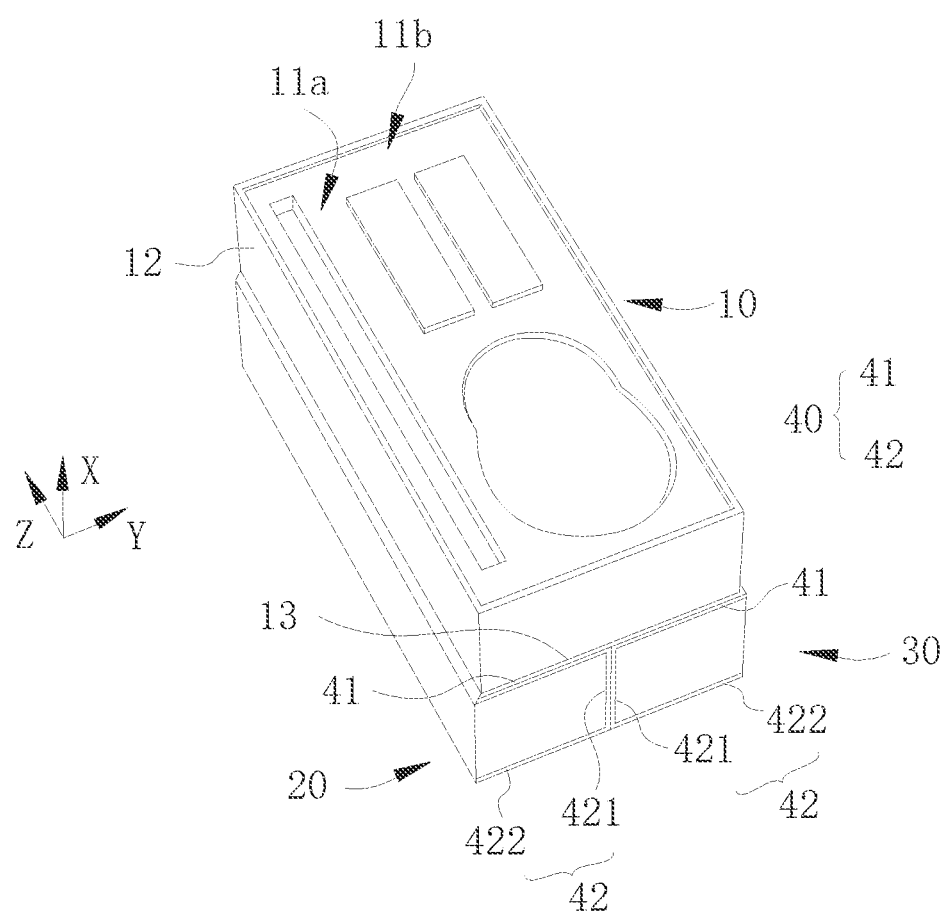
FIG. 7 is another structural schematic diagram of the packaging box provided by the present disclosure in the second state.
Figure 8:
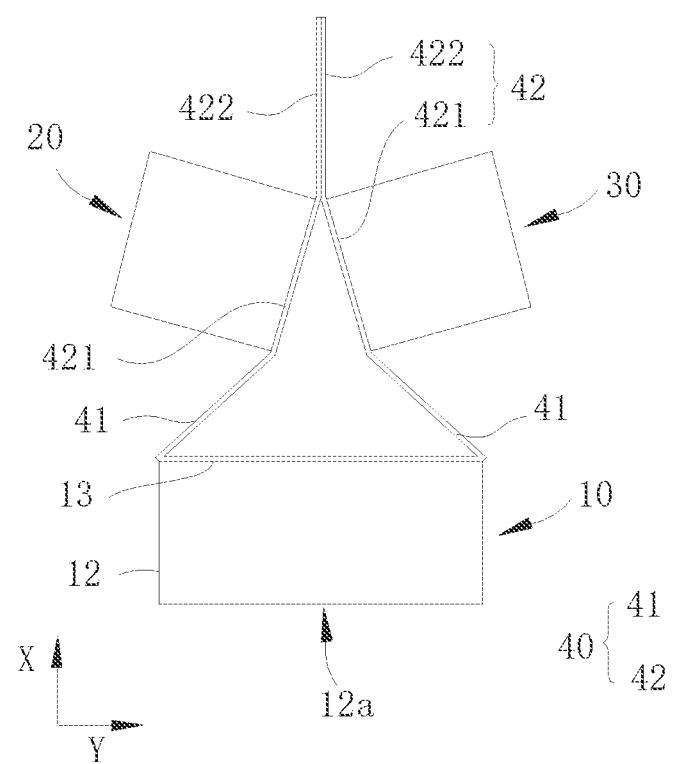
FIG. 8 is yet another structural schematic diagram of the packaging box provided by the present disclosure in the second state.

Referring to FIGS. 7 and 8, alternatively, the packaging box can include two different morphological structures in the second sub-state. FIGS. 7 and 8 respectively show the structural schematic diagram of the packaging box in the first sub-state.

Alternatively, the connecting plates 40 arranged in pairs in the packaging box in the first state (as shown in FIG. 1) are first turned over to a certain angle toward the second surface direction, and then turned over to a certain angle toward the first surface direction, and then Turn a certain angle toward the second surface direction, so that the paired connecting plates 40 are respectively disposed on the side of the first box body 10 away from the first opening 11b in the first direction An opening 11b is open. At this time, the packaging box is converted from the first state to the second sub-state in the second state, and the packaging box is in the first form structure in the second sub-state (as shown in FIG. 7).

For example, the connecting plates 40 arranged in pairs in the packaging box in the first state are first flipped 90° toward the second surface direction, then flipped 90° toward the first surface direction, and then flipped 180° toward the second surface direction. °, so that the packaging box is in the first morphological structure in the second sub-state.

Specifically, the paired first plates 41 in the packaging box in the first state are turned over 90° toward the second surface direction relative to the bottom wall 13, and then the paired second plates 42 and/or the paired The provided first sub-plate 421 is turned over 90° toward the first surface direction relative to the first plate 41, and then the paired first boards 41 are turned over 180° toward the second surface direction relative to the bottom wall 13, so that the packaging box is turned over. The first state transition (shown in FIG. 1) is the first morphological structure in the second sub-state (shown in FIG. 7).

At this time, the second box body 20 and the third box body 30 are respectively located on the side of the first box body 10 away from the first opening 11b in the first direction Y and are arranged closely with the first box body 10. The first opening 11b In the open setting, the user can observe the products in the first receiving part 11 through the first opening 11b, or take and place the products in the first receiving part 11 through the first opening 11b.

Figure 6:
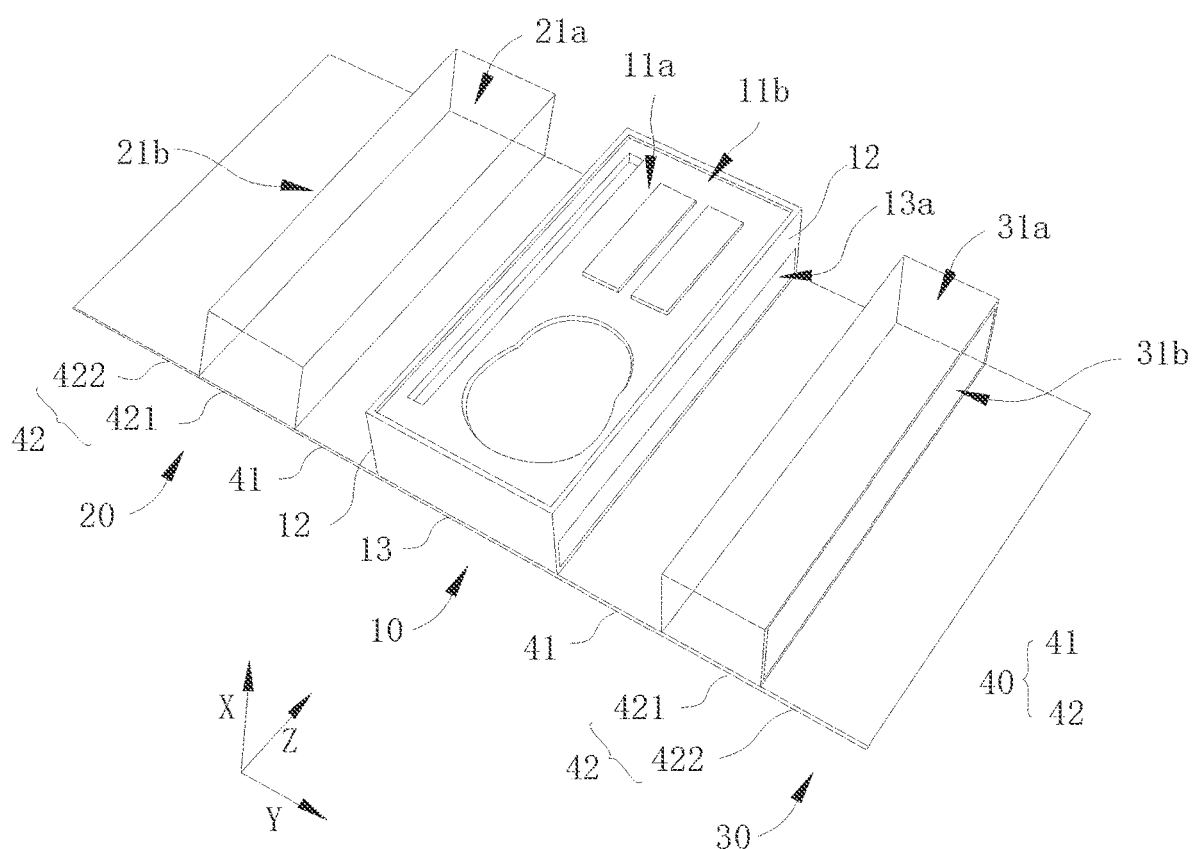
FIG. 6 is another structural schematic diagram of the packaging box provided by the present disclosure in the second state.

Alternatively, the packaging box in the second state is in the second form structure (as shown in FIG. 6) in the first sub-state, and the direction is turned 180°, and the first sub-plate 421 and the second sub-plate 422 respectively move close to each other along the second direction Y and fit together, so that the pair of connecting plates 40 are respectively disposed on the side of the first box body 10 away from the first opening 11b in the first direction X and separated from the side wall 12, so that the first opening 11b is open. At this time, the packaging box is converted from the first state to the second sub-state in the second state, and the packaging box is in the second form structure in the second sub-state (as shown in FIG. 8).

At this time, the second box body 20 and the third box body 30 are respectively located on the side of the first box body 10 away from the first opening 11b in the first direction Y and are spaced apart from the first box body 10. The user can use the hand to lift the first sub-plate 421 and the second sub-plate 422 that are attached together so that the packaging box can be lifted up, which is conducive to improving the functionality of the packaging box and improving the fun of using the packaging box of the present disclosure to meet the different needs of users.

It can be understood that the above is only an example of the folding process of the connecting plate 40 when the packaging box is transformed from the second form structure in the first sub-state to the second form structure in the second sub-state. The proposed packaging box can also be transformed from other states into the second form structure in the second sub-state, and is not limited to this.

Alternatively, as shown in FIGS. 1 and 2, in the first state, the angle between a connecting plate 40 attaching a side wall of the first box body 10 and the bottom wall 13 is 90°, that is, the orthographic projection of the connecting plate 40 attaching a side wall of the first box body 10 and the bottom wall 13 in the first direction X forms an L-shaped structure.

For example, in the first state, the angle between the first plate 41 and the bottom wall 13 is 90°.

Alternatively, in the second state, the included angle between the connecting plate 40 that is at least partially separated from the side wall 12 and the bottom wall 13 is greater than 90°.

For example, as shown in FIGS. 3 to 6, in the first sub-state, the angle between the connecting plate 40 that is at least partially separated from the side wall 12 and the bottom wall 13 is 180°, that is, the angle between the connecting plate 40 and the bottom wall 13 is 180°. The orthogonal projection in the first direction X of the at least partially separated connecting plate 40 and the bottom wall 13 forms a linear structure.

For example, in the first sub-state, the angle between the first plate 41 and the bottom wall 13 is 180°.

For example, as shown in FIG. 7, in the second sub-state, the angle between the connecting plate 40 that is at least partially separated from the side wall 12 and the bottom wall 13 is 360°, that is, the connecting plate 40 that is at least partially separated from the side wall 12 is arranged to overlap with the bottom wall 13 in the first direction X. Alternatively, as shown in FIG. 8, the included angle between the connecting plate 40 that is at least partially separated from the side wall 12 and the bottom wall 13 is between 120° and 160°, forming a ">"-shaped structure.

For example, in the second sub-state, the angle between the first plate 41 and the bottom wall 13 is 360° or between 120° and 160°.

The packaging box proposed in the examples of the present disclosure can be transformed in various forms and structures. It only needs to fold the connecting plates 40 to change the connection between the connecting plate 40 and the first box body 10, which is convenient for operation and improves the packaging box. Its functionality, versatility and fun can meet the different needs of users.

In some alternative examples, in the first state, the length of the first plate 41 in the first direction X is the same as the length of the side wall 12 in the first direction X.

Arranged in this way, it is beneficial to ensure the cleanliness of the products in the first accommodating cavity 11a and prevent external impurity particles from entering the first accommodating cavity 11a through the gap between the first box body 10 and the first plate 41 to damage the products inside. The problem of contamination will help improve the protection of the product, thereby improving the safety and reliability of the packaging box.

At the same time, it is also advantageous for the connecting plates 40 to be folded so that the packaging box has a variety of different shapes and structures, thereby improving the versatility of the packaging box and meeting different needs of users.

In some alternative examples, in the first state, the length of the first plate 41 in the first direction and the length of the second box body and/or the third box body 30 on Y are the same.

By arranging in this manner, the connecting plate 40 can be folded so that the packaging box has a variety of different shapes and structures, thereby improving the versatility of the packaging box and meeting the different needs of users. At the same time, it is helpful to improve the aesthetics of the packaging box.

Alternatively, in the first state, the length of the side wall 12 in the first direction X is the same as the length of the second box body 20 and/or the third box body 30 in the second direction Y.

Alternatively, in the first state, the length of the first sub-plate 421 in the first direction X is the same as the length of the second sub-plate 422 in the second direction Y.

Please refer to FIGS. 5 and 6. In some alternative examples, along the first direction, the bottom wall 13 and the first accommodating part 11 are spaced apart, and there is a cavity between the bottom wall 13 and the first accommodating part 11.

Alternatively, in the first direction X, the length of the first accommodating part 11 is greater than a smallest distance between the first accommodating part 11 and the bottom wall 13, and the cavity 13a may be used to accommodate some small items such as product manuals.

Alternatively, the first box body 10 has a fourth opening communicating with the cavity 13a in the second direction Y. The number of the fourth openings may be one, and of course, the number of the fourth openings may be two.

Since the second box body 20 and the third box body 30 are respectively located on both sides of the first box body 10 in the second direction Y and are spaced apart from the first box body 10, the products in the cavity 13a can be transported along the second direction Y. It can be taken out from the side close to the second box body 20 in the direction Y, or from the side close to the third box body 30 in the second direction Y.

The packaging box provided by the examples of the present disclosure can be converted into the second state. Specifically, it can be converted into the second form structure in the first sub-state, so that the items in the cavity 13a can be displayed or taken away, which is beneficial to improving the versatility of the box.

In some alternative examples, the first box body 10, the second box body 20, and the third box body 30 each is formed in a rectangular structure.

Setting it in this way facilitates the conversion of the packaging box in different states, so that the packaging box can be transformed into different forms and structures to meet different user needs.

Alternatively, in the third direction Z, the orthographic projections of the second box body 20 and the third box body 30 are both squares.

In some alternative examples, the packaging box further includes a plurality of magnetic clasps, and the first box body 10, the second box body 20, the third box body 30 and the connection assembly are respectively provided with magnetic clasps.

The packaging box provided by the example of the present disclosure also includes a plurality of magnetic pieces, such as magnetic clasps, so that the packaging box can form a stable structure under different transition states, which is beneficial to the protection of the products in the box and prevents the products in the box from falling out, and, setting it in this way also facilitates the opening and closing of the packaging box, which facilitates operation and saves operating time.

In the first state of the packaging box, the first sub-plate 421 and the second sub-plate 422 are respectively provided with magnetic clasps on the sides close to each other in the second direction Y, and the first sub-plate 421 and the second sub-plate 422 can close the second opening 21b and the third opening 31b using the magnetic clasps to attach magnetically. The second box body 20 and the third box body 30 are respectively provided with magnetic clasps on the surfaces close to each other in the second direction Y. The second box body 20 and the third box body 30 are arranged to close the first opening 11b.

Alternatively, the magnetic clasps on the first sub-plate 421 can also have a magnetic attraction effect with the magnetic clasps on the side of the second box body 20 close to the third box body 30 in the second direction Y, so that the first sub-plate 421 is attached to the side of the second box body 20 close to the third box body 30 in the second direction Y.

Correspondingly, the magnetic clasps on the second sub-plate 422 can also have a magnetic attraction effect with the magnetic clasps on the side of the third box body 30 that is close to the second box body 20 in the second direction Y, so that the side wall 12 is attached to a side of the third box body 30 close to the third box body 30 in the second direction Y.

The above description only takes the position of the magnetic clasp/s of the packaging box in the first state as an example, and the positions of the magnetic clasps in other states will not be described again here.

Alternatively, the number of magnetic clasps provided on the first box body 10, the second box body 20, the third box body 30 and the connection assembly can be one or two respectively, and of course, it can also be provided in multiple numbers respectively.

Through the above arrangement, the use of magnets to absorb and fix the molding is conducive to improving the reliability of the fixation and molding of the packaging box, and it is easy to close and change the state of the packaging box, so that it has a variety of combined structures, is easy to operate, and has strong functionality.

The above are only preferred examples of the present disclosure, and are not intended to limit the patent scope of the present disclosure. Any equivalent structure or equivalent process transformation made using the contents of the description and drawings of the present disclosure may be directly or indirectly used in other related technical fields, are all equally included in the patent protection scope of the present disclosure.

What is claimed is:
1. A packaging box, comprising:
    a first box body, comprising a first accommodating part having a first accommodating cavity and a first opening communicating with the first accommodating cavity in a first direction;
    a connection assembly comprising a pair of connecting plates that are distributed opposite to each other on two sides of the first box body in a second direction, wherein the second direction intersects with the first direction;

a second box body connected to one plate of the pair of connecting plates and having a second accommodation cavity; and a third box body connected to the other plate of the pair of connecting plates and having a third accommodation cavity;

wherein the packaging box is configured to switch between a first state to close the first opening and a second state to open the first opening;

wherein the pair of connecting plates comprise a pair of first plates and a pair of second plates that are in bending connection, the second box body is connected to one of the pair of second plates, and the third box body is connected to the other of the pair of second plates; and wherein in the first state, a length of the pair of first plates in the first direction is the same as a length of the second box body or the third box body in the second direction.

2. The packaging box according to claim 1, wherein the first box body comprises a bottom wall arranged opposite to the first opening along the first direction, and the connecting plates arranged in pair are configured to bend and connect with the bottom wall.

3. The packaging box according to claim 1, wherein the pair of connecting plates comprises a pair of first plates and a pair of second plates that are in bending connection, the second box body is connected to one of the pair of second plates, the third box body is connected to the other of the pair of second plates.

4. The packaging box according to claim 1, wherein in the second state, the pair of first plates are at least partially separated from the side walls.

5. The packaging box according to claim 1, wherein the second box body has a second opening communicating with the second accommodation cavity in the first direction, and the third box body has a third opening communicating with the third accommodation cavity in the first direction.

6. The packaging box according to claim 5, wherein the pair of second plates comprises a pair of first sub-plates and a pair of second sub-plates that are in bending connection, a first sub-plate is disposed between a first plate and a second sub-plate, and a first sub-plate is in bending connection with a first plate and a second sub-plate, one of the pair of second sub-plates is configured to close the second opening, and the other of the pair of second sub-plates is configured to close the third opening.

7. The packaging box according to claim 1, wherein in the first state, a length of a first plate in the first direction is the same as a length of a side wall in the first direction.

8. The packaging box according to claim 2, wherein along the first direction, the bottom wall and the first accommodating part are spaced apart, and there is a cavity between the bottom wall and the first accommodating part.

9. The packaging box according to claim 1, wherein the first box body, the second box body and the third box body each is formed in a rectangular structure.

10. The packaging box according to claim 1, wherein the packaging box further comprises a plurality of magnetic clasps, the first box body, the second box body, the third box body and the connection assembly respectively comprise the plurality of magnetic clasps.

11. The packaging box according to claim 1, wherein the second state comprises a first sub-state and a second sub-state, and the packaging box configured to switch between the first sub-state and the second sub-state;

wherein in the first sub-state, the pair of connecting plates are respectively arranged on both sides of the first box body along the second direction, and wherein in the second sub-state, the pair of connecting plates are respectively arranged on one side of the first box body along the first direction.

12. The packaging box according to claim 1, wherein the second box body and the third box body each have a square orthographic projection in a third direction, wherein the third direction intersects both the first direction and the second direction.

13. The packaging box according to claim 8, wherein the first box body has at least a fourth opening communicating with the cavity in the second direction.

14. The packaging box according to claim 11, wherein the first sub-state comprises a first form structure;

wherein the second box body is attached to the first box body, and wherein the third box body is attached to the first box body.

15. The packaging box according to claim 11, wherein the first sub-state comprises a second form structure;

wherein the second box body is spaced apart from the first box body, and wherein the third box body is spaced apart from the first box body.

16. The packaging box according to claim 11, wherein the second sub-state comprises a first form structure;

wherein the first box body comprises a bottom wall arranged opposite to the first opening along the first direction; and wherein the pair of connecting plates are arranged to overlap with the bottom wall in the first direction.

17. The packaging box according to claim 11, wherein the second sub-state comprises a second form structure;

wherein the pair of second plates comprise a pair of first sub-plates and a pair of second sub-plates that are in bending connection, a first sub-plate is disposed between a first plate and a second sub-plate, and a first sub-plate is in bending connection with a first plate and a second sub-plate; and wherein two sub-plates of the pair of second sub-plates are magnetically attached in the second direction.

* * * * *